United States Patent Office.

MARGARET KNOTTS, OF CARONDELET, MISSOURI.

Letters Patent No. 65,235, dated May 28, 1867.

IMPROVED MEDICAL COMPOUND.

The Schedule referred to in these Letters Patent and making part of the same.

TO ALL WHOM IT MAY CONCERN:

Be it known that I, Mrs. MARGARET KNOTTS, of Carondelet, in the county of St. Louis, and State of Missouri, have invented a new and improved Medical Compound; and I do hereby declare that the following is a full, clear, and exact description thereof, which will enable those skilled in the art to make and use the same.

The present invention relates to a medical compound for the relief and cure of piles, which compound is composed of the following ingredients, mixed together in and about the proportions stated, viz:

One-half pound of the bark of persimmon, one-half pound of winter fern, three quarts of water, one pound of hog's lard, one-quarter pound of mutton suet, one-quarter one ounce of rosin. The bark of persimmon and winter fern in the proportions above stated are first boiled in the water for one hour, more or less, when, being strained, the hog's lard, mutton suet, and rosin are then added, and the whole heated in any suitable manner until reduced to a salve.

If the compound is to be taken internally, one pound of the winter fern is used to five quarts of water, boiled down to a gallon. To use the liquid take one tablespoonful three times a day.

I claim as new, and desire to secure by Letters Patent—

The medical compound made substantially as and for the purpose described.

MARGARET KNOTTS.

Witnesses:
    THOMAS W. LEVANT,
    H. R. CROWE.